US011261966B2

(12) United States Patent
Kirchner

(10) Patent No.: US 11,261,966 B2
(45) Date of Patent: Mar. 1, 2022

(54) PARKING BRAKE AND OPERATING METHOD

(71) Applicant: VALEO SIEMENS EAUTOMOTIVE GERMANY GMBH, Erlangen (DE)

(72) Inventor: Eckhard Kirchner, Erlangen (DE)

(73) Assignee: VALEO SIEMENS EAUTOMOTIVE GERMANY GMBH, Erlangen (DE)

( * ) Notice: Subject to any disclaimer, the term of this patent is extended or adjusted under 35 U.S.C. 154(b) by 172 days.

(21) Appl. No.: 16/309,050

(22) PCT Filed: Jun. 14, 2017

(86) PCT No.: PCT/EP2017/064556
§ 371 (c)(1),
(2) Date: Dec. 11, 2018

(87) PCT Pub. No.: WO2017/216230
PCT Pub. Date: Dec. 21, 2017

(65) Prior Publication Data
US 2020/0309262 A1    Oct. 1, 2020

(30) Foreign Application Priority Data

Jun. 16, 2016 (DE) ...................... 10 2016 210 757.7

(51) Int. Cl.
*F16H 63/34* (2006.01)
*B60T 1/00* (2006.01)
(Continued)

(52) U.S. Cl.
CPC .......... *F16H 63/3416* (2013.01); *B60T 1/005* (2013.01); *B60T 1/062* (2013.01);
(Continued)

(58) Field of Classification Search
CPC ............. F16H 63/3416; F16H 63/3425; F16H 63/3458; F16H 63/3466; F16H 63/48;
(Continued)

(56) References Cited

U.S. PATENT DOCUMENTS 3,929,384 A    12/1975 Larsen
6,338,288 B1    1/2002 Spadaccini et al.
(Continued)

FOREIGN PATENT DOCUMENTS

DE    10 2012 205 576 A1    10/2013
DE    10 2015 218 411 B3    2/2017
(Continued)

OTHER PUBLICATIONS

English language machine translation of the description of FR 2964925 A1. Retrieved from Espacenet on Aug. 12, 2020. (Year: 2020).*

(Continued)

*Primary Examiner* — Richard M Lorence
(74) *Attorney, Agent, or Firm* — Manabu Kanesaka

(57) ABSTRACT

The invention relates to a parking brake for a motor vehicle, including a pivotable locking mechanism for applying a retaining force to a parking brake gear. The locking mechanism can lock into the parking brake gear by means of an axially movable first actuation unit. According to the invention, the first actuation unit is designed as a spring-loaded cam follower. The invention also relates to an operating method for locking and unlocking the parking brake.

9 Claims, 6 Drawing Sheets

(51) Int. Cl.
  *B60T 1/06* (2006.01)
  *B60T 7/12* (2006.01)
  *F16D 63/00* (2006.01)
  *F16H 63/48* (2006.01)
  *F16D 121/14* (2012.01)
  *F16D 125/30* (2012.01)
  *F16D 125/58* (2012.01)
(52) U.S. Cl.
  CPC .............. *B60T 7/12* (2013.01); *F16D 63/006* (2013.01); *F16H 63/483* (2013.01); *F16D 2121/14* (2013.01); *F16D 2125/30* (2013.01); *F16D 2125/585* (2013.01)
(58) Field of Classification Search
  CPC ........ F16H 63/483; B60T 1/005; B60T 1/062; B60T 7/12; F16D 63/006; F16D 2121/14; F16D 2125/30; F16D 2125/585
  See application file for complete search history.

(56) References Cited

U.S. PATENT DOCUMENTS

| | | | | |
|---|---|---|---|---|
| 7,757,832 | B2 * | 7/2010 | Sauter | ................ F16H 63/3416 192/219.5 |
| 2011/0186400 | A1 | 8/2011 | Villeneuve | |
| 2015/0066324 | A1 | 3/2015 | Baehrle-Miller et al. | |
| 2015/0160684 | A1 * | 6/2015 | Valier | ................ F16H 63/3416 192/218 |
| 2017/0088111 | A1 | 3/2017 | Kirchner | |

FOREIGN PATENT DOCUMENTS

| | | | |
|---|---|---|---|
| EP | 2 930 078 A1 | 10/2015 | |
| FR | 2 934 341 A1 | 1/2010 | |
| FR | 2 964 925 A1 | 3/2012 | |
| JP | 2008128470 A * | 6/2008 | ......... F16H 63/3416 |
| WO | 2015/098969 A1 | 7/2015 | |

OTHER PUBLICATIONS

English language machine translation of the description of JP 2008-128470 A. Retrieved from Espacenet on Aug. 12, 2020. (Year: 2020).*

PCT/ISA/210, "International Search Report for International Application No. PCT/EP2017/064556", dated Sep. 8, 2017.

* cited by examiner

PARKING BRAKE AND OPERATING METHOD

RELATED APPLICATIONS

The present application is National Phase of International Application No. PCT/EP2017/064556 filed Jun. 14, 2017, and claims priority from German Application No. 10 2016 210 757.7, filed Jun. 16, 2016, the disclosure of which is hereby incorporated by reference herein in its entirety.

The invention relates to a parking brake for a motor vehicle, in particular a road vehicle, a method for operating same, a program for implementing the method, and a suitable control unit for a corresponding parking brake.

Document DE 10 2015 218 411 B3 discloses a parking brake which comprises a parking brake gear and an associated actuation pawl. To actuate the parking brake, the actuation pawl can be moved by means of a first or second actuation unit. The first and second actuation unit are in this case substantially spherical bodies which are movable along a spindle axis. As the actuation unit is moved, the current consumption thereof is measured and on this basis the position of the actuation unit and the actuation pawl is determined.

Document U.S. Pat. No. 6,338,288 B1 discloses a brake for rail vehicles which comprises a rotatable body to which a brake lever is attached. The rotatable body comprises recesses, which are designed to receive a pawl, such that the rotatable body is held in a corresponding position. The pawl can be actuated by means of a key. The pawl also comprises a recess, in which a spring-biased ball or a spring-biased plunger engages in an open or closed position of the brake. The positioning of the pawl in the corresponding position is hereby stabilised against effects such as vibration.

In the field of automotive engineering, there is a need for parking brake systems which can be reliably actuated by means of simple operation in any driving or parking situation and which can be produced with low outlay. In addition, a connection of mechanical systems to the motor vehicle electronics system is desired, such that there is always information available regarding the state of operation and/or actuation of a mechanical system such as a parking brake. A technically simple and economical implementation is desired for this purpose as well. The object of the invention is to provide an improved parking brake which can be reliably actuated, has a reduced number of components, and can be produced cost-efficiently.

The outlined problem is solved by the parking brake according to the invention. The parking brake is designed for a motor vehicle, in particular a road vehicle, and comprises a parking brake gear, which is connected in a torque-transmitting manner to a wheel of the motor vehicle. The parking brake also comprises a locking mechanism, for example a pawl, which is designed to engage or lock with the parking brake gear. The locking mechanism is pivotable and exerts a holding force onto the parking brake gear by means of a pawl tooth in a holding position. The locking mechanism is moved by means of a first actuation unit between the holding position and a rest position and is itself formed axially. In accordance with the invention the first actuation unit is designed as a spring-loaded cam follower, which can change its size elastically along its longitudinal axis. Due to the spring elasticity of the spring-loaded cam follower, a continuous transfer of force to the locking mechanism is achieved even if the axial force is discontinuous or rapidly rising. The spring-loaded cam follower in the solution according to the invention implements the principle of an energy store acting in translation.

If, when the locking mechanism is pressed against the parking brake gear, an opposition position is present, in which a tooth of the parking brake gear and a tooth of the actuation unit are opposite one another, the first actuation unit receives a rising axial force in the form of a spring compression. When the motor vehicle then moves on further, for example rolls forward, the parking brake gear rotates further until a gap position is reached between the locking mechanism and the parking brake gear. In a gap position, the toothing of the parking brake gear and of the locking mechanism are opposite one another in such a way that mutual engagement is possible. When the gap position is entered, the first actuation unit is lengthened by the restoring force in the spring-loaded cam follower, such that the locking mechanism is locked into the toothing of the parking brake gear. Consequently, reliable locking of the parking brake is possible independently of the angular position of the parking brake gear.

The parking brake according to the invention makes it possible, upon actuation thereof, to apply the axial force to the first actuation unit without consideration of further conditions. A sensor assembly by means of which the angular position of the parking brake gear can be determined is therefore superfluous. It is also possible to dispense with a feedback of information to a control unit of a drive means by which the axial force is applied to the first actuation unit. At the same time, a high level of reliability is ensured. The parking brake on the whole has a reduced number of components and therefore also can be produced in a simple and economical way.

In a preferred embodiment of the parking brake according to the invention, the first actuation unit is moved axially by a cam element. The cam element is arranged on a side of the first actuation unit facing away from the locking mechanism and presses with its edge contour onto the first actuation unit. Cam elements can be produced with an arbitrary edge contour and, by means of a suitably designed edge contour, offer a selectable force-path characteristic in the event of the axial movement of the first actuation unit. For example, a linear, progressive or degressive rising force can be set in the axial direction based on the angular position of the cam element. For example, the speed of the parking brake actuation can be selected hereby, wherein a slow parking brake actuation allows a reduction of the actuation noise. The parking brake according to the invention, by a corresponding choice of the edge contour of the cam element, consequently can be adapted in a simple way to different requirements, such as actuation speed or user comfort. With regard to the shaping of the cam element, the invention offers an increased degree of design freedom. This makes it possible to produce the cam element using a large number of manufacturing methods, for example sintering, punching or non-round grinding.

Furthermore, the cam element can be rotatable in only one direction, in particular an intended direction of rotation. There is thus circumferential contact at the edge contour of the cam element between the first actuation unit and the cam element during operation. The cam element preferably has a continuous edge contour, that is to say a smooth edge contour. If the cam element is in a position in which the first actuation unit is locked into the parking brake gear, an unlocked position of the first actuation unit can be produced by rotating the cam element further. To this end, the cam element can be provided with a freewheel, which blocks a rotation against the intended direction of rotation of the cam element. The freewheel can also be designed in a form-fitting or frictionally engaging manner. Alternatively or additionally, the control of a drive means for the cam element, for example an electric motor, can be designed such that rotation of the cam element in just one single direction is possible. The locking and unlocking of the parking brake are possible in accordance with the invention by a single movement, specifically the rotation of the cam element. Thus, different actuation forces causing damage to the parking brake cannot occur simultaneously in the claimed parking brake. An unintentional opening of the parking brake by rotation against the intended single direction of rotation and a resultant release of the locking element are thus counteracted. The control of a drive means with which the cam element is rotated, for example an electric motor, can also be simplified. The reliability, ease of maintenance and economic viability of the parking brake are thus further increased on the whole.

In the parking brake according to the invention, the first actuation unit can also be provided with a damper, in particular a viscous or viscous elastic damper. The damper is particularly preferably arranged in the first actuation unit itself. The damper, during operation of the parking brake, avoids rapid movements of the first actuation unit and/or locking mechanism which can cause these to collide. A development of noise is counteracted hereby when the parking brake is unlocked, for example. The higher the damping factor of the damper is selected to be, the greater is the extent to which the development of noise is avoided. The lower the damping factor is selected to be, the quicker is the actuation of the parking brake. The parking brake according to the invention is thus adjustable in respect of user comfort and actuation speed. Alternatively, the first actuation element can be produced at least partially from a material which offers sufficient internal damping. Consequently, at least one component of the first actuation element and the damper are formed in one part, which offers an increased level of functional integration or functional compaction. Equally, at least one bearing, for example a rotary bearing, plain bearing or rolling bearing, can also be formed in the parking brake according to the invention at least partially from a material having a sufficiently high internal damping, such that the effect of the damper is further increased. A further functional compaction is attained with a bearing of this kind in the sense of a lightweight design.

In the claimed parking brake the first actuation unit can comprise a rounded portion or can be provided with a plain bearing or rolling bearing at the end facing the cam element. As a result of the rounded portion or the plain bearing or rolling bearing, the contact area between the edge contour of the cam element and the first actuation unit is influenced such that contact pressures are reduced. Additionally, the friction present between the first actuation unit and the cam element is reduced. This results in a reduced abrasion at the contact area, thus preventing damage to the cam element and/or the first actuation unit. Equally, the necessary actuation forces are reduced, such that the cam element can be operated also with a drive means of reduced drive power. In the sense of the parking brake according to the invention, a plain bearing or rolling bearing is to be understood to mean a machine element which ensures rolling contact between the first actuation unit and the cam element, for example a roller. Alternatively, by way of a planar plain bearing element, a state of mixed friction is reached, in which the frictional forces at the contact area are reduced. Furthermore, a self-locking effect between the first actuation unit and the cam element is avoided by means of a rounded portion or a plain bearing or rolling bearing. Operating states in which actuation of the parking brake is not possible are thus prevented, and an increased level of reliability is ensured.

In a preferred embodiment the spring-loaded cam follower comprises a first ram element, in which at least one second ram element is received axially movably. The first ram element is an outer part and is preferably formed as a sleeve, and the second ram element is an inner part, which preferably is formed as a pin. A spring element is also arranged in the first ram element, which spring element exerts a restoring force onto the second ram element when said second ram element moves. The spring element acts in the axial direction, such that the second ram element is resiliently mounted. A further axially movable ram element is preferably received in the first ram element and cooperates with the spring element in the sleeve. A spring-mounted cam follower of this kind comprising two pins implements the technical principle of a spring bar and forms an energy store acting in translation. The pins of the spring-mounted cam follower can in each case be formed solid or hollow. Spring-mounted cam followers can be produced cost-efficiently and in a simple way within a wide range of sizes and spring rates. Consequently, the kinematics of the parking brake according to the invention can be adjusted by the selection of a suitably dimensioned spring-mounted cam follower. For example, the force exerted by the locking mechanism onto the parking brake gear in an opposition position can be selected by the dimensioning of the spring-mounted cam follower. The speed at which the locking mechanism engages in the parking brake gear once the gap position has been reached and the loudness of the noise occurring at the same time are determined hereby. Spring-mounted cam followers are robust with respect to a material fatigue, even with a high number of actuation cycles. The claimed parking brake consequently has a high service life.

In a further preferred embodiment of the invention the parking brake is equipped with a measuring device, which is connected to the drive means which moves the cam element. The measuring device is designed to detect the current consumption of the drive means. On account of the mechanical coupling between the locking mechanism, the first actuation unit and the cam element, the current consumption of the drive means represents the forces that are present or the state of mechanical loading of the parking brake. For example, a compressive loading of the first actuation unit leads to an increasing pressing force, and therefore friction, between the cam element and the first actuation unit, which in turn requires an increased drive power for the cam element. By means of the measuring device, the parking brake according to the invention is suitable for identifying the particular operating state already on the basis of individual, easily detectable physical variables. The claimed parking brake thus contributes to improving a motor vehicle electronics system with comprehensive diagnosis functions for a motor vehicle.

The parking brake can more preferably be equipped with at least one switch, by means of which it is possible to detect whether a selectable angular position of the cam element has been reached. The at least one switch is preferably designed to send a pulse-like signal when the selected angular position is reached. For example, it is thus possible to identify that a defined rest position or holding position of the parking brake has been reached and to transfer this to the motor vehicle electronics system. The diagnosis functionality of a corresponding motor vehicle electronics system is hereby improved.

The parking brake according to the invention can also be provided with a second axially movable actuation unit, which is arranged in the region of the cam element. The second axially movable actuation unit is designed to engage in a toothing which is formed on the cam element. Upon engagement of the second actuation unit in the toothing, a torque is exerted on the cam element and this is set in rotation. The second actuation unit is designed in such a way that, as a result of the engagement in the toothing, the cam element is rotated by a certain actuation angle. The actuation angle is preferably selected in such a way that the cam element is movable from a holding position into a rest position by a corresponding rotation. To this end, the actuation angle corresponds at least to the angle between the holding position and the rest position in the direction of rotation of the cam element. The second axially movable actuation unit makes it possible to release the cam element independently of the drive means. The axially movable second actuation unit is preferably formed as a linearly acting actuator, which can be used directly successively several times over. The axially movable second actuation unit is particularly preferably formed as a magnetic bolt which can be triggered by a simple electrical pulse. The parking brake according to the invention can be released redundantly using the second actuation unit. The second actuation unit can also be used to assist the drive means, for example when increased frictional forces occur between the first actuation unit and the cam element. On the whole, the robustness of the parking brake according to the invention is further increased by the second axially movable actuation unit. In a further embodiment of the parking brake according to the invention, the second actuation unit can also be formed as a hydraulic actuator, for example as a hydraulic cylinder.

The object forming the basis of the present invention is also achieved by an operating method for a parking brake which comprises a parking brake gear connected in a torque-transmitting manner to a wheel of a motor vehicle, in particular a road vehicle. The parking brake has a pivotable locking mechanism, which is designed to lock into the parking brake gear in order to lock the parking brake. The locking mechanism is moved by an axially movable first actuation unit. The first actuation unit is formed here as a spring-mounted cam follower. In a first method step, the parking brake is provided in an open state, i.e. the locking mechanism is not locked into the parking brake gear. In a following method step the locking mechanism is moved by the first actuation unit in a locking direction, that is to say towards the parking brake gear. The first actuation unit is then compressed by the force acting thereon when an opposition position is present between the parking brake gear and the locking mechanism. An opposition position is to be understood to mean that a tooth of the parking brake gear and a tooth of the actuation unit are opposite one another. The first actuation unit is supported here on one side on the locking mechanism. The locking mechanism is prevented from locking into the parking brake gear. At the same time, a spring tension is built up in the first actuation unit.

In a further method step a gap position is established between the parking brake gear and the locking mechanism. A gap position is understood to mean a relative positioning of the parking brake gear and the locking mechanism in which mutual engagement as possible. The gap position is produced for example in that the motor vehicle, when the opposition position is present, rolls on further. As a result of the prevented locking of the locking mechanism, there is only a minimal braking effect on the opposition position. In such a state, the motor vehicle also rolls in one direction on a substrate that is minimally inclined. The parking brake gear is hereby moved further. As soon as the gap position is present, the locking mechanism is locked into the parking brake gear by the spring tension in the first actuation unit. The method according to the invention thus ensures that the parking brake is locked independently of the original angular position of the parking brake gear. The axial actuation forces present at the first actuation unit are taken up in the form of spring tension by the design of said actuation unit as a spring-mounted cam follower. A feedback-free actuation kinematics is attained as a result. Furthermore, spring-mounted cam followers are available cost-efficiently in a wide range of sizes and spring rates. The higher is the spring rate in the spring-mounted cam follower, the quicker and more reliable are the locking into the parking brake gear. By contrast, the lower is the spring rate in the spring-mounted cam follower, the quieter is the locking process. The method according to the invention thus allows operation of the parking brake that can be adapted in a simple manner to comfort and reliability requirements. The operating method according to the invention requires merely the application of an actuation force in order to axially move the first actuation unit and is consequently possible with a small number of components.

In the method according to the invention the locking mechanism is preferably actuated by the edge contour of a cam element. The cam element is rotated preferably in just one direction during the claimed method. Cam elements have, to the greatest possible extent, a freely selectable edge contour of varying radius, such that the design of the movement dynamics of the first actuation unit can be selected. For example, based on the angular position of the cam element, a progressive, constant or degressive rise in the deflection of the first actuation unit is selectable. The parking brake is consequently easily adaptable in respect of its actuation behaviour. Rotation in a uniform direction makes it possible to simplify the control of the drive means which rotates the cam element. This reduction in complexity offers an increase in robustness, ease of maintenance and cost efficiency.

In addition, in the method according to the invention, proceeding from the presence of an opposition position between the parking brake gear and the locking mechanism, entry into a gap position can be identified and detected. Here, the current consumption at a drive means by which the cam element is rotated is detected, for example using a watt meter. The current consumption during the rotation of the cam element when the opposition position is reached is caused substantially by what is known as system friction, that is to say friction caused by the first actuation unit in contact with the parking brake gear. Upon entry into the gap position, the first actuation unit relaxes, and therefore the force exerted onto the parking brake gear is reduced. The frictional force directed against the rotation of the cam element is consequently also reduced, such that the power necessary to move the cam element is reduced. The reduced power requirement is accompanied by a reduced current consumption. In the claimed operating method a threshold value can be set, with which the detected decrease of the current consumption is compared. If the value of the decrease of the current consumption exceeds the threshold value, a transfer from the opposition position into the gap position is identified on this basis in the claimed method. Suitable measuring devices for measuring the current consumption can be placed physically separately from the mechanical components of the parking brake. The principle of a physical function separation is thus implemented for a mechanical function. The omission of a sensor assembly in the region of mechanical components simplifies the utilisation of the available installation area, which allows a saving of space. In addition, the parking brake can be recalibrated by the unique identification of a locking. For example, deviations in the form of these components caused for example by abrasion and/or deformation at the locking mechanism and/or parking brake gear can be compensated as a result. Consequently, an exact actuation is possible over the entire service life of the parking brake. A recalibration is necessary only in the event of a position loss of the parking brake. The solution according to the invention does not require a persistent memory, that is to say a non-volatile memory, in which calibration data are stored. An incorporation of the parking brake according to the invention in motor vehicle electronics functions such as "wake up" or "go to sleep" is hereby simplified.

The object of the present invention is also achieved by a program which can be stored and executed in a control unit used in a motor vehicle. The program is designed to implement the method according to the invention in at least one of the above-described embodiments in a parking brake. Equally, the object of the present invention is achieved by a control unit according to the invention. The control unit according to the invention has a memory and a computing unit and is thus suitable for storing and executing programs. The control unit has a signal input for receiving an actuation command and a signal output for controlling a drive means of the parking brake. The control unit can additionally be connected to a measuring device and/or a switch, which deliver information regarding the present operating state of the parking brake. The control unit is designed in accordance with the invention to store and execute an above-described program for controlling a parking brake and therefore to implement the method according to the invention. The method according to the invention thus can be implemented in an existing parking brake for example as an auxiliary function via a software update. The object forming the basis of the invention is also achieved by a control unit for a parking brake which has a memory and a computing unit and is designed to execute the program outlined above.

The invention will be explained in greater detail hereinafter on the basis of exemplary embodiments which are shown in the drawings, in which.

Figure 1:
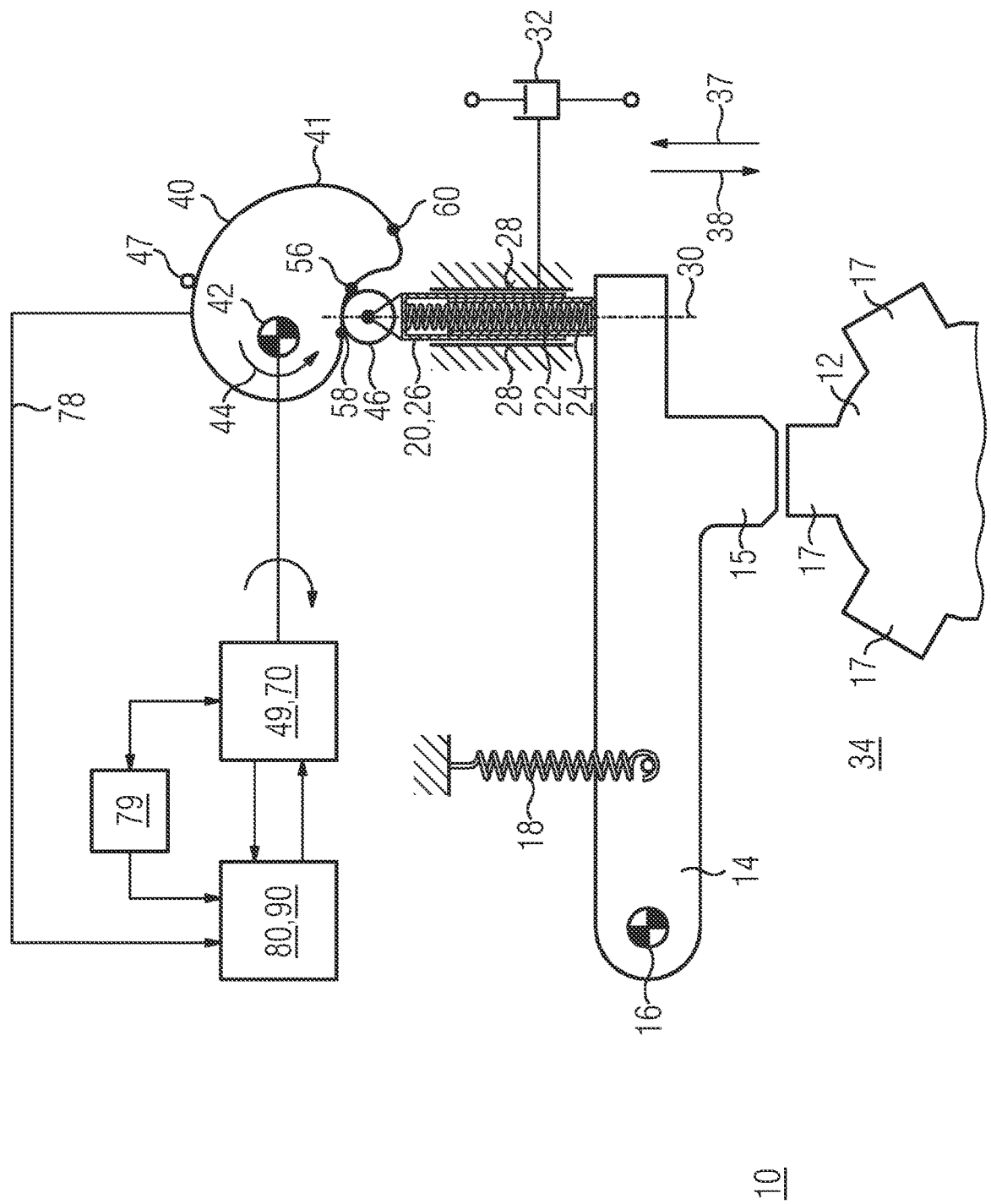
FIG. 1 shows the structure of an embodiment of the parking brake according to the invention in an opposition position.
Figure 2:
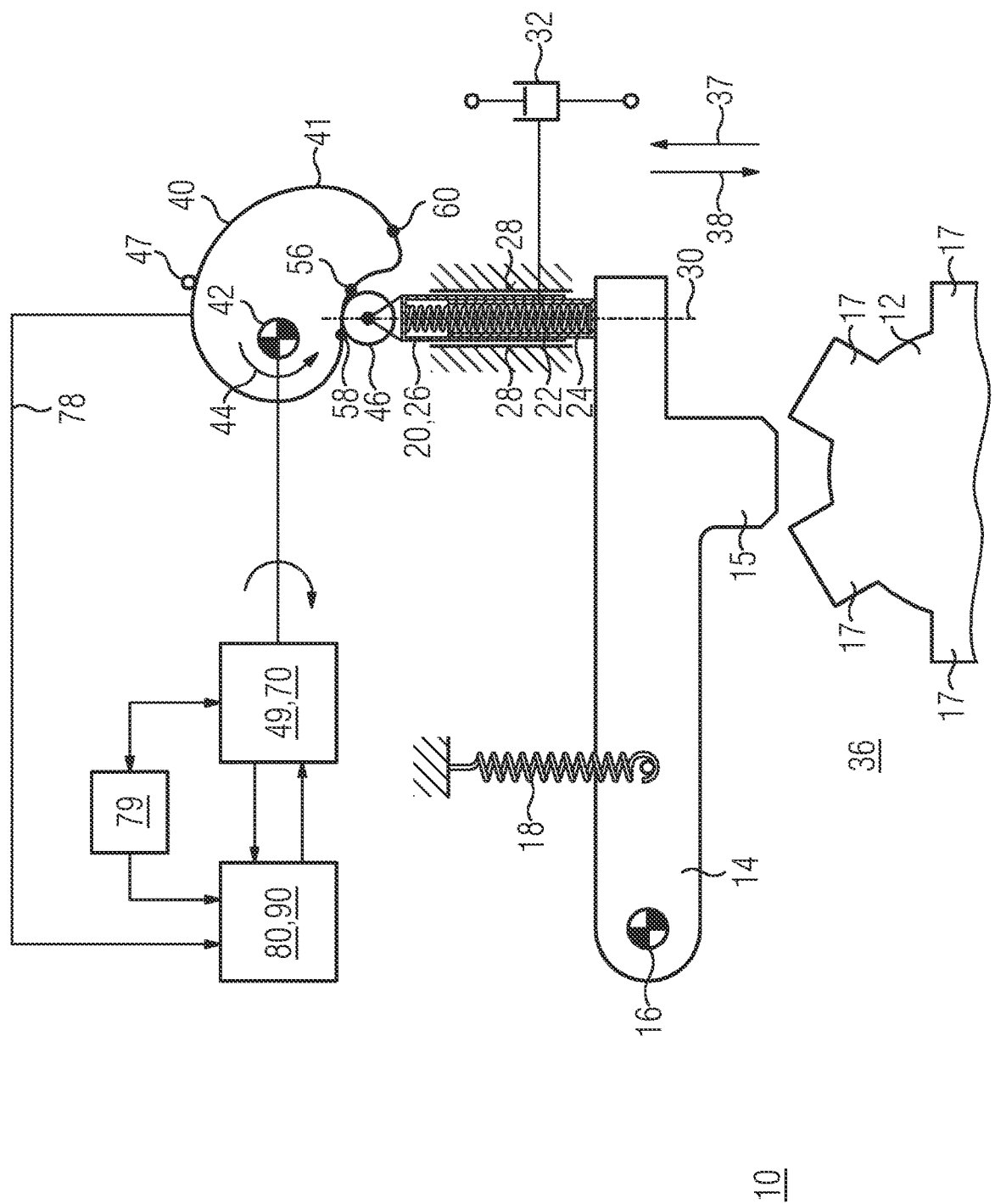
FIG. 2 shows the structure of the parking brake from FIG. 1 in a gap position.

FIG. 1 and FIG. 2 each show the structure of an embodiment of the parking brake 10 according to the invention. The parking brake 10 comprises a locking element 14, which is pivotable about a pivot bearing 16. The locking element 14 is formed substantially as a pawl and has a pawl tooth 15, which is suitable for locking into a parking brake gear 12 placed opposite. The locking mechanism 14 is connected to an opening spring 18, which exerts a force onto the locking mechanism 14 in an opening direction 37. A force directed in a closing direction 38 can be exerted by a first actuation unit 20 by pressing onto the locking mechanism 14. In FIG. 1 an opposition position 34 is present between the parking brake gear 12 and the locking mechanism 14. In the opposition position 34, the pawl tooth 15 of the locking mechanism 14 is opposite a parking brake gear 17. As the first actuation unit 20 moves in the closing direction 38, the locking mechanism 14 is prevented from locking into the parking brake gear 12, such that there is no blocking effect of the parking brake 10. By contrast, in FIG. 2, a gap position 36 is provided, in which the pawl tooth 15 is opposite a gap between two adjacent parking brake gear teeth 17, which allows mutual engagement.

The first actuation unit 20 is received in a guide 28 so as to be axially movable along its longitudinal axis 30 and presses with one end against the locking mechanism 14. The first actuation unit 20 is formed as a spring-mounted cam follower and comprises a first and a second follower element 24, 26, which are displaceable relative to one another axially, that is to say along the longitudinal axis 30. In the first actuation unit 20, a spring element 22 is also received, which is supported on the two follower elements 24, 26. The first follower element 24 is formed as a sleeve and the second follower element 26 is formed as a pin. By means of the spring element 22, the first actuation unit 20 is suitable for receiving a force, acting in the axial direction 30, as a deformation, here a compression, of the spring element 22. The spring element 22 is formed as a compression spring, such that a compression leads to an exertion of force of the first actuation unit 20 onto the locking mechanism 14 in the closing direction 28. The first actuation unit 20 is also equipped with a viscous elastic damper 32, which is shown symbolically in FIG. 1. The viscous elastic damper 32 is used to delay rapid movements of the first actuation unit 20 along the axial direction 30. As a result, the first actuation unit 20 is prevented from striking against the locking mechanism 14 and/or an edge contour 41 of a cam element 40 in the event of sudden changes in state or actuations in the parking brake 10. The development of noise during operation of the parking brake 10 is thus counteracted. The first actuation unit 20, at its end facing away from the locking mechanism 14, also has a plain bearing or rolling bearing 46, which is supported on the edge contour 41 of the cam element 40.

The cam element 40 is secured to a rotatable bearing 42 and is rotatable by a drive means 49 (not shown in greater detail in FIGS. 1 and 2). The cam element 40 is also equipped with a freewheel 47, which prevents rotation against the intended direction of rotation 44. Consequently, the cam element 40 is rotatable only in one direction. In FIG. 1 the parking brake 10 is in an open state, in which the mechanical contact between the first actuation unit 20 and the cam element 40 in an unlocking position 56 is present at the edge contour 41 of the cam element 40. With rotation of the cam element 40 in the intended direction of rotation 44, the mechanical contact at the edge contour 41 passes a locking start point 58. The locking start point 58, as considered against the intended direction of rotation 44, constitutes the position from which the radius of the cam element 40 increases. Once the locking start point 58 has been passed, the first actuation unit 20 is pressed increasingly further into the closing direction 38 of the parking brake 10. The radius of the cam element 40 reaches its maximum in the region of a locking position 60. The parking brake 10, in particular the drive means 49, according to FIGS. 1 and 2 is controlled by a control unit 90, in which a corresponding program 80 is stored such that it can be executed. The control unit 90 is coupled to a measuring device 79, which is suitable for detecting the current consumption 70 of the drive means 49. The control unit 90 is connected to a switch 78, by means of which it is possible to detect that a certain angular position of the cam element 40 has been reached.

Figure 3:
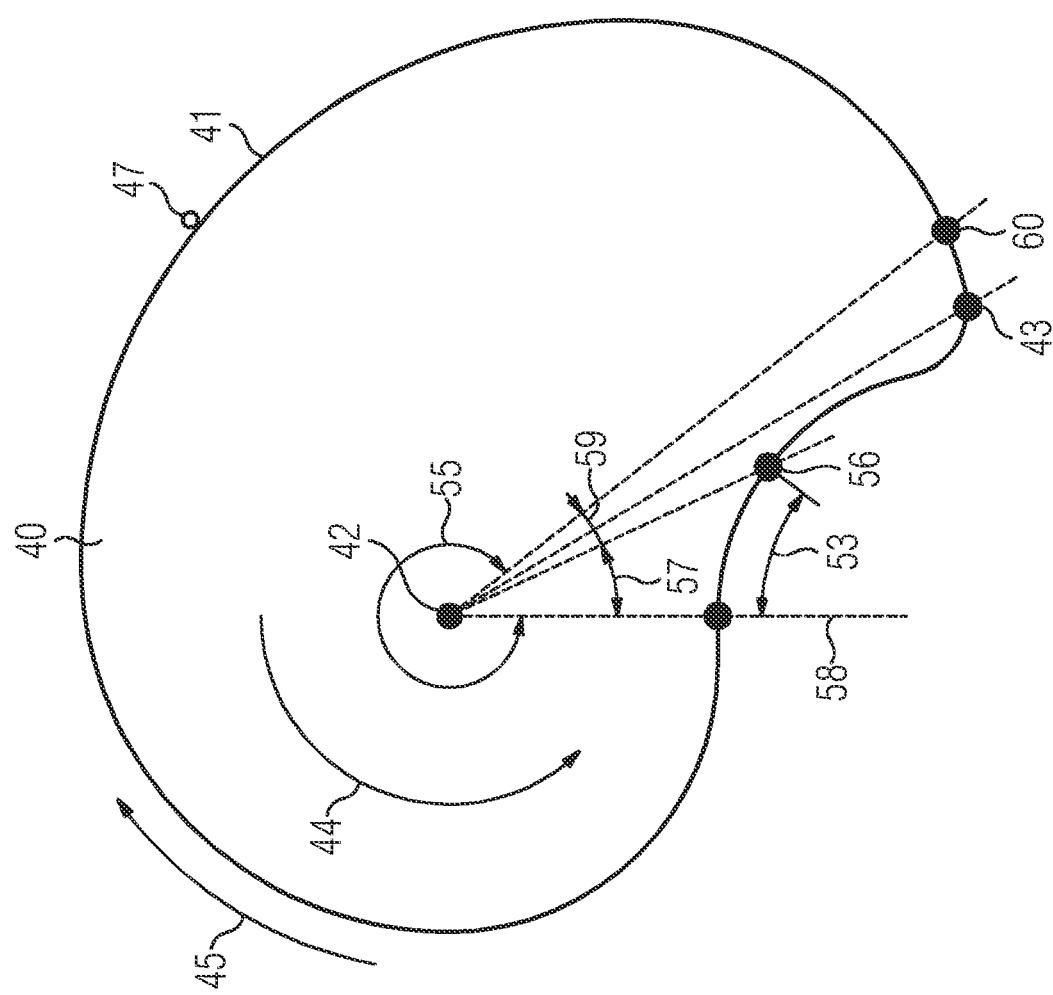
FIG. 3 shows a detailed view of an embodiment of a cam element for the parking brake according to the invention.

FIG. 3 shows in detail a cam element 40 which can be used in the parking brake 10 according to FIG. 1 and FIG. 2. The cam element 40 is secured to the rotatable bearing 42 and is rotated during operation only in the intended direction of rotation 44. Consequently, the mechanical contact with the first actuation unit 20 (not shown in greater detail) at the edge contour 41 moves along the contact circumferential direction 45. An inactive region 53 is provided at the edge contour between the unlocking position 56 and the locking start point 58. When the mechanical contact between the first actuation unit 20 and the cam element 40 is in the inactive region 53, at most a minor locking actuation of the parking brake 10 is caused. The inactive region 53 is defined based on the rotatable bearing 42 by the idling angle 57.

The locking angle 55 follows between the locking start point 58 and the locking position 60. In the region of the locking angle 55, the radius of the edge contour 41 increases, such that the first actuation unit 20, in the event of mechanical contact with the cam element 40 in this region, is moved increasingly in the closing direction 38 according to FIGS. 1 and 2. What is intended is that the cam element 40, in order to hold a locking of the parking brake 10, is held in such a way that the mechanical contact with the first actuation unit 20 remains at the locking position 60.

The unlocking angle 59 lies between the locking position 60 and the unlocking position 56, based on the rotatable bearing 42. The maximum 43 of the radius of the edge contour 41 lies within the unlocking angle 59. The radius of the edge contour 41 increases between the locking position 60 and the maximum 43. The cam element 40 is hereby prevented from automatically rotating further in the locking position 60 along the intended direction of rotation 44 and reaching the unlocking position 56. Automatic rotating against the intended direction of rotation 44 is prevented by the freewheel 47. Consequently, the locking of the parking brake 10 is a stable state, even without additional technical components.

Figure 4:
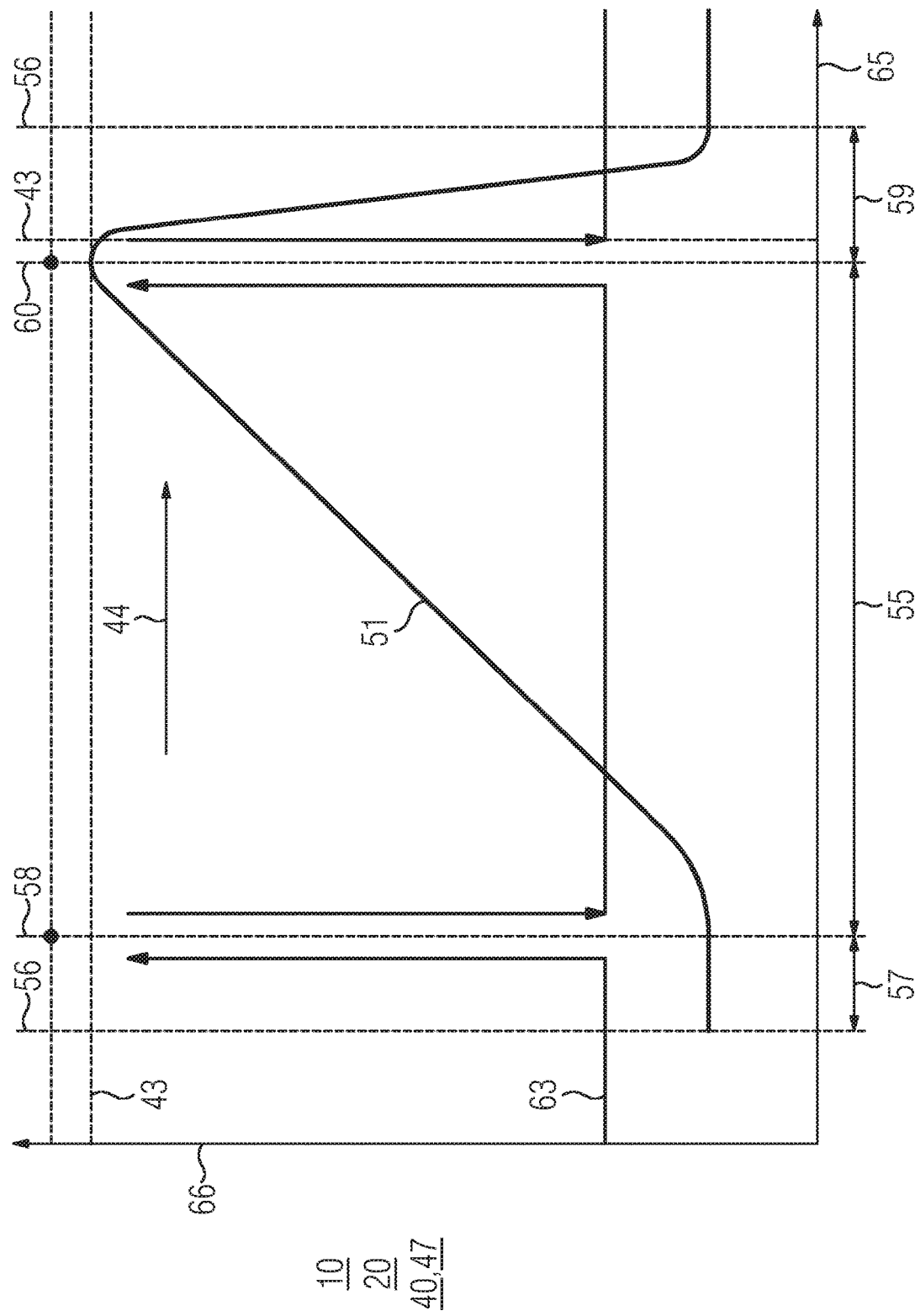
FIG. 4 shows an angle-actuation stroke graph of an embodiment of a cam element for the parking brake according to the invention.

FIG. 4 shows a graph of a rotation of a cam element 40 as shown for example in FIG. 3. The horizontal graph axis is an angle axis 65, which shows the point at which the mechanical contact with the first actuation unit 20 of the parking brake 10 is present on the edge contour 41. The radial height of the edge contour 41 and the signal status of an indication signal 63 are shown on the vertical axis. The characteristic curve 51 thus shows the edge contour radius 51 present at the mechanical contact between the first actuation unit 10 and the cam element 40. The cam element 40 rotates in the intended direction of rotation 44. In the region of the unlocking position 56, the edge contour radius 51 has a minimum, which remains substantially constant as far as the end of the idling angle 57. The indication signal 63 also remains in a binary LOW state. As the locking start point 58 is passed, as the end of the region of the idling angle 57, the indication signal 63 temporarily assumes a binary HIGH state. This state change is indicated by switches 78 to a control unit 90 of the parking brake 10. An indication of this kind allows an automatic position determination for the drive means of the parking brake 10, for example following a failure of a software module. The idling angle 57 is followed by the locking angle 55, in which the edge contour radius 51 increases substantially linearly. In the region of the locking position 60, the indication signal 63 temporarily assumes a binary HIGH state and thus indicates that the locking position 60 has been reached. The locking angle 55 is followed by the unlocking angle 59, in which the edge contour radius 51 drops back to its minimum. The unlocking angle 59 lies here between the locking position 60 and the unlocking position 56. The maximum 43 of the edge contour radius 51 also lies within the unlocking angle 59.

Figure 5:
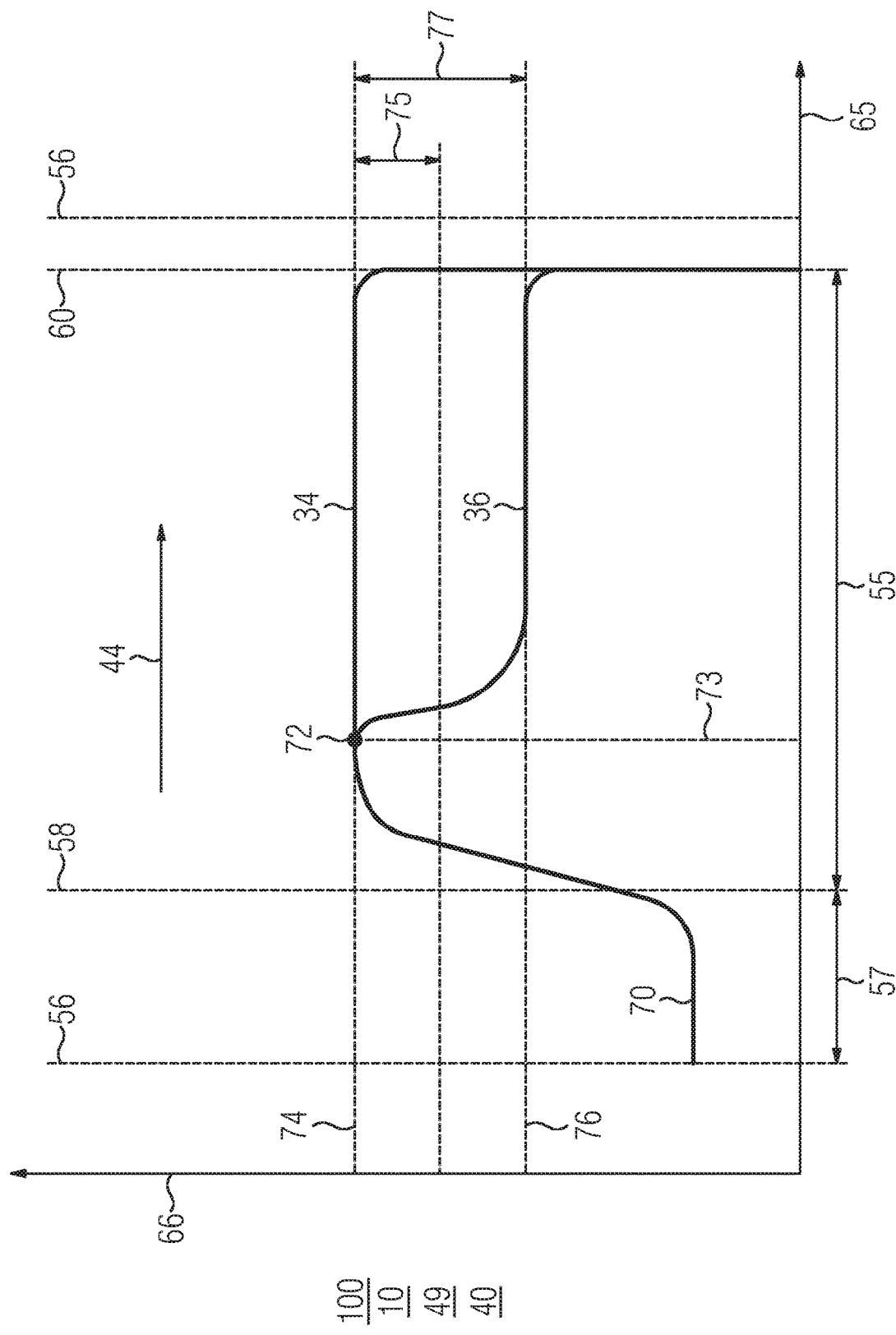
FIG. 5 shows an angle-current consumption graph of an actuation process of an embodiment of the parking brake according to the invention.

FIG. 5 shows an angle-current consumption graph of a drive means 49 of a cam element 40 upon actuation in accordance with the operating method 100 according to the invention. More specifically, two different possible curves are shown. The horizontal axis in FIG. 5 forms the angle axis 65, which shows the angular position of the mechanical contact (not shown in greater detail) between the cam element 40 and the first actuation unit 20. The level of the current consumption 70 of the drive means 49 which rotates the cam element 40 in the intended direction of rotation 44 is shown on the vertical axis. In the region of the idling angle 57, that is to say between the unlocking position 56 and the locking start point 58, only a minimum of drive power is necessary, and therefore the current consumption 70 is substantially constant. From the locking start point 58, the current consumption 70 rises and firstly remains at a reference level 74.

Here, the first actuation unit 20 is compressed from the locking start point 58 the branch point 72. In the locking angle 55, there is a branch point 72, from which there start two different possible curves of the current consumption 70. If an opposition position 34 is present between the locking mechanism 14 and the first actuation unit 20, the current consumption 70 remains at the reference level 74. Here, the first actuation unit 20 is compressed further and the restoring force on the locking mechanism 14 is increased. The cam element 40 is rotated until the locking position 60 is reached, in which the energy feed to the drive means 49 is interrupted. The current consumption 70 consequently drops to zero.

Alternatively, a gap position 36 is present from the branch point 72. As the gap position 36 is entered, the first actuation unit 20 relaxes at least in part. The restoring force exerted by the first actuation unit 20 onto the cam element 40 is thus reduced, such that the power necessary to further rotate the cam element 40 reduces. Accordingly, the current consumption 70 drops back again once the gap position 36 is entered. For the further movement to the locking position 60, the current consumption 70 remains at a lower comparison level 76 than with a persistent opposition position 34. The value of the difference 77 between the reference level 74 and the comparison level 76 is higher than an adjustable threshold value 75. The threshold value 77 is adjustable by way of a corresponding input into a program which controls the parking brake 10 according to the invention. The transition from the opposition position 34 to the gap position 36 as the branch point 72 is passed in the parking brake 10 consequently can be detected with a selectable sensitivity.

Figure 6:
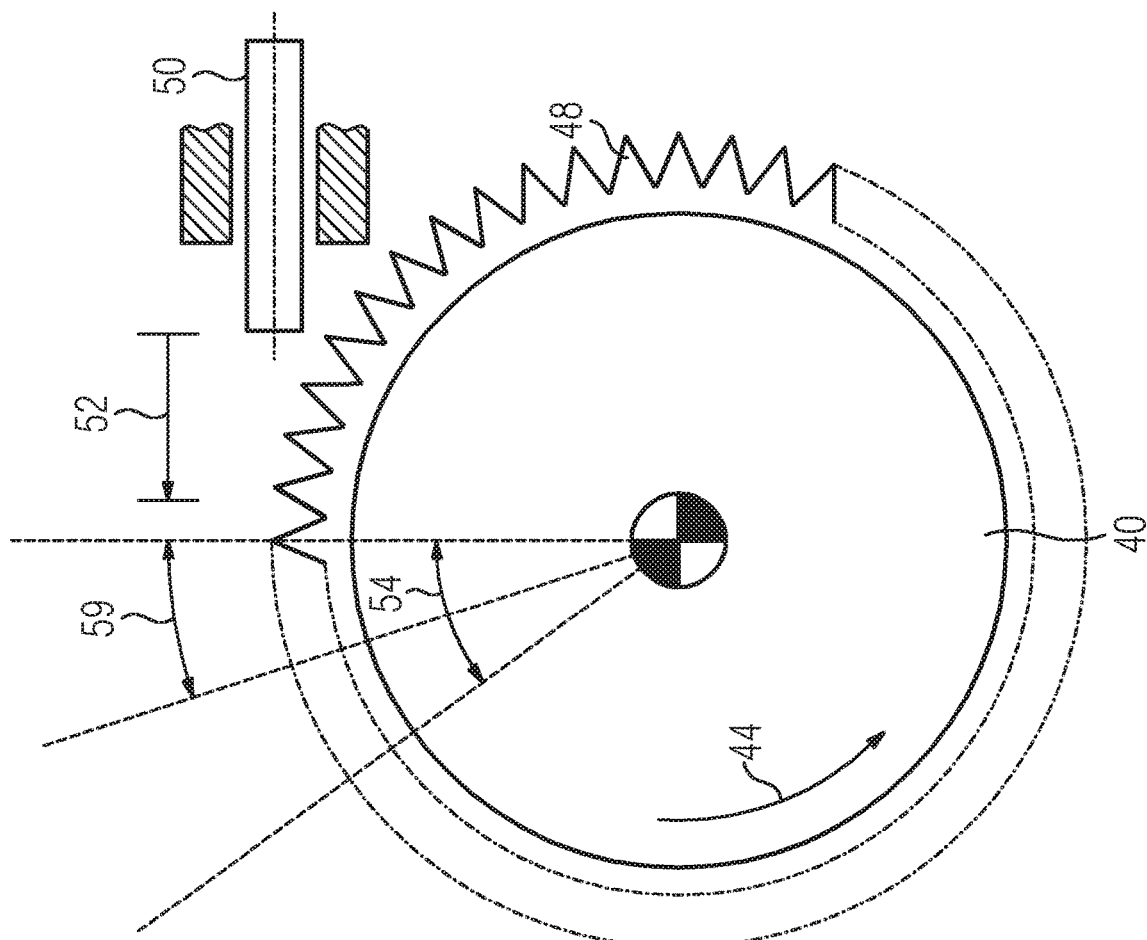
FIG. 6 shows a detailed view of a further embodiment of the cam element.

FIG. 6 shows a detailed view of an embodiment of a cam element 40 which can be used in a parking brake according to FIGS. 1 and 2. The cam element 40 is provided with a toothing 48, with which the cam element 40 can be rotated in the intended direction of rotation 44. A second actuation unit 50 is also arranged adjacently to the cam element 40. The second actuation unit 50 is formed as a magnetic bolt which is designed to perform an axial stroke 52. The second actuation unit 50 is dimensioned and placed for engagement in the toothing 48 of the cam element 40. By means of the second actuation unit 50 striking against the toothing 48, the cam element 40 is rotated further. The rotation of the cam element 54 triggerable by the axial stroke 52 of the second actuation unit 50 has the value of a defined constant actuation angle 54. The actuation angle 54 exceeds the unlocking angle 59, which lies between the locking position 60 and the unlocking position 56 of the cam element 40 in the direction of rotation 44. The second actuation unit 50 is hereby always able to unlock the parking brake 10. By means of the second actuation unit 50, the principle of redundant actuation is implemented in the parking brake 10, and therefore the reliability of the parking brake 10 is increased.

LIST OF REFERENCE SIGNS

10 parking brake
12 parking brake gear
14 locking mechanism
15 pawl tooth
16 pivot bearing
17 parking brake gear tooth
18 opening spring
20 first actuation element
22 spring element
24 first follower element
26 second follower element
28 follower guide
30 axial direction
32 damper
34 opposition position
36 gap position
37 opening direction
38 closing direction
40 cam element
41 edge contour
42 cam bearing
43 maximum radius
44 intended direction of rotation
44 contact circumferential direction
45 rolling bearing
46 freewheel
47 ratchet toothing
49 drive means
50 second actuation element
51 edge contour radius
52 actuation stroke
53 idling region
54 actuation angle
55 locking angle
56 unlocking position
57 idling angle
58 locking position
59 unlocking angle
60 locking position
63 position signal
65 angle axis
66 contour axis
70 current consumption
72 branch point
73 angular position of branching
74 reference level
75 threshold value
77 difference
78 switch
79 measuring device
80 program
90 control unit

The invention claimed is:

1. A parking brake for a motor vehicle, comprising a pivotable locking mechanism for exerting a holding force on a parking brake gear,
   wherein the locking mechanism can be locked into the parking brake gear by means of an axially movable first actuation unit,
   wherein the first actuation unit is designed as a spring-mounted cam follower,
   wherein the first actuation unit is axially movable by means of a cam element,
   wherein the parking brake comprises a second axially movable actuation unit, which is designed to engage in a toothing on the cam element to rotate the cam element, and
   wherein a drive means of the cam element is coupled to a measuring device which is designed to detect a current consumption of the drive means.

2. The parking brake according to claim 1, wherein the cam element rotates in just one direction.

3. The parking brake according to claim 1, wherein the first actuation unit is equipped with a damper to delay a restoring movement.

4. The parking brake according to claim 1, wherein the first actuation unit, at an end facing the cam element, has a rounded portion or a plain bearing or rolling bearing for reducing friction with the cam element.

5. The parking brake according to claim 1, wherein the spring-mounted cam follower comprises a first follower element, in which at least one second follower element mounted elastically in the axial direction is received.

6. An operating method for a parking brake with a parking brake gear, a pivotable locking mechanism that can lock thereinto, and an axially movable first actuation unit, which is designed as a spring-mounted cam follower and is axially movable by means of a cam element, said method comprising the following steps:
   a) providing the parking brake in an open state;
   b) moving the locking mechanism in a locking direction by means of the actuation unit;
   c) compressing the first actuation unit when an opposition position is present between the parking brake gear and the locking mechanism;
   d) elastically returning the first actuation unit when a gap position is present between the parking brake gear and the locking mechanism,
   wherein the parking brake comprises a second axially movable actuation unit, which is designed to engage in a toothing on the cam element to rotate the cam element.

7. The operating method according to claim 6, wherein the locking mechanism in step b) is actuated by a cam element, which is rotated in a constant direction of rotation.

8. The operating method according to claim 7, further comprising step e) wherein the parking brake is released by further rotating the cam element.

9. The operating method according to claim 6, wherein during step c) the fact that a gap position between the locking mechanism and the parking brake gear has been entered is detected when a current consumption of a drive means of the cam element drops at least by an adjustable threshold value.

* * * * *